United States Patent [19]

Drahanowsky

[11] Patent Number: 4,880,181
[45] Date of Patent: Nov. 14, 1989

[54] REEL-HUB FOR A TAPE

[75] Inventor: Walter Drahanowsky, Vienna, Australia

[73] Assignee: U.S. Philips Corporation, New York, N.Y.

[21] Appl. No.: 202,158

[22] Filed: Jun. 2, 1988

[30] Foreign Application Priority Data

Jun. 3, 1987 [AT] Austria ............................ 1409/87

[51] Int. Cl.$^4$ ............................................ B65H 75/28
[52] U.S. Cl. ........................................ 242/74; 742/197
[58] Field of Search ............... 242/199, 68.5, 74, 71.8, 242/68, 68.5, 71.8, 71.9, 74, 74.1, 77, 179, 197, 199

[56] References Cited

U.S. PATENT DOCUMENTS

| 3,556,426 | 1/1971 | Olander | 242/74 |
| 4,176,804 | 12/1979 | Nemoto et al. | 242/68.5 |
| 4,213,578 | 7/1980 | Katata | 272/74 |
| 4,403,749 | 9/1983 | Nakagawa | 242/71.8 |

FOREIGN PATENT DOCUMENTS 1493789 11/1977 United Kingdom ................ 242/74

Primary Examiner—Donald Watkins
Attorney, Agent, or Firm—Brian J. Wieghaus

[57] ABSTRACT

A cylindrical reel-hub for a tape, in particular a magnetic-tape or ink ribbon, is divided in into two semicylindrical reel-hub portions along a dividing zone. The reel-hub portions are integrally interconnected by an elastically deformable bridge which bounds the dividing zone at one end and which constitutes a hinge between the two reel-hub portions. The reel-hub portions are held together by a connecting means at the open end of the dividing zone to clamp a tape introduced into the clamping zone between them. The two ends of the dividing zone are substantially diametrically opposite one another and the dividing zone extends in a substantially radial direction at its open end.

18 Claims, 2 Drawing Sheets

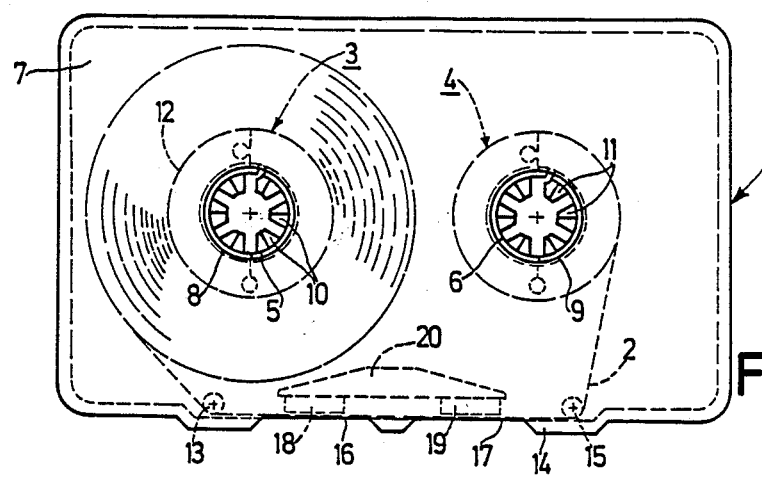
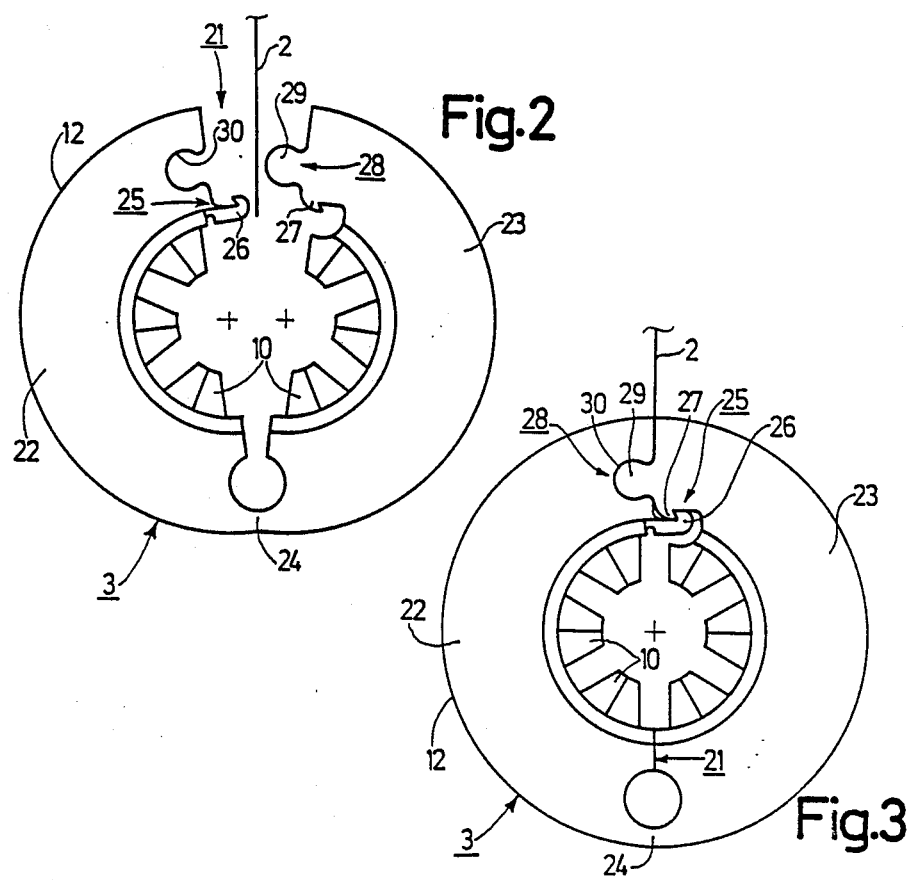
Fig.1
Fig.2
Fig.3

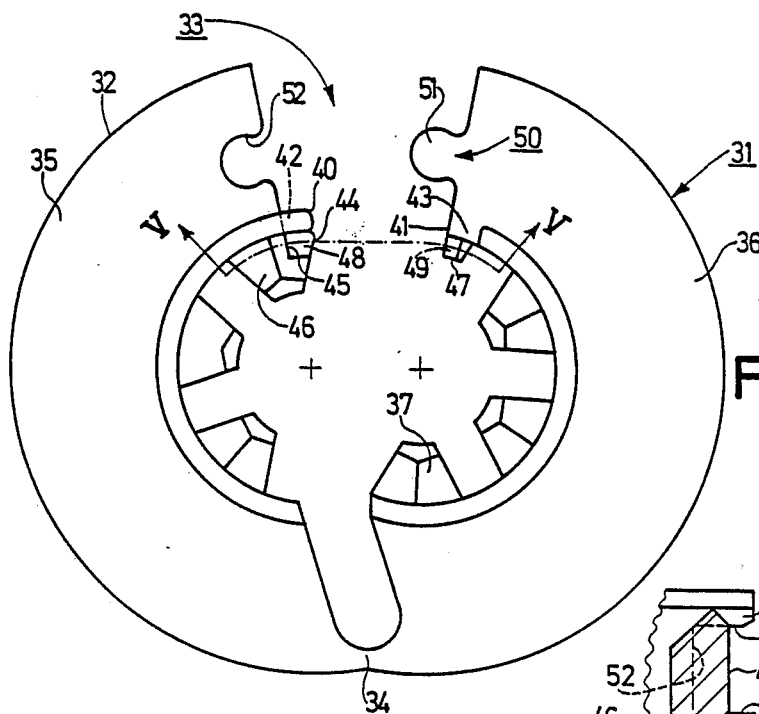
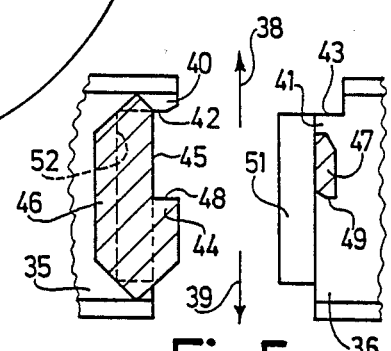
Fig.5
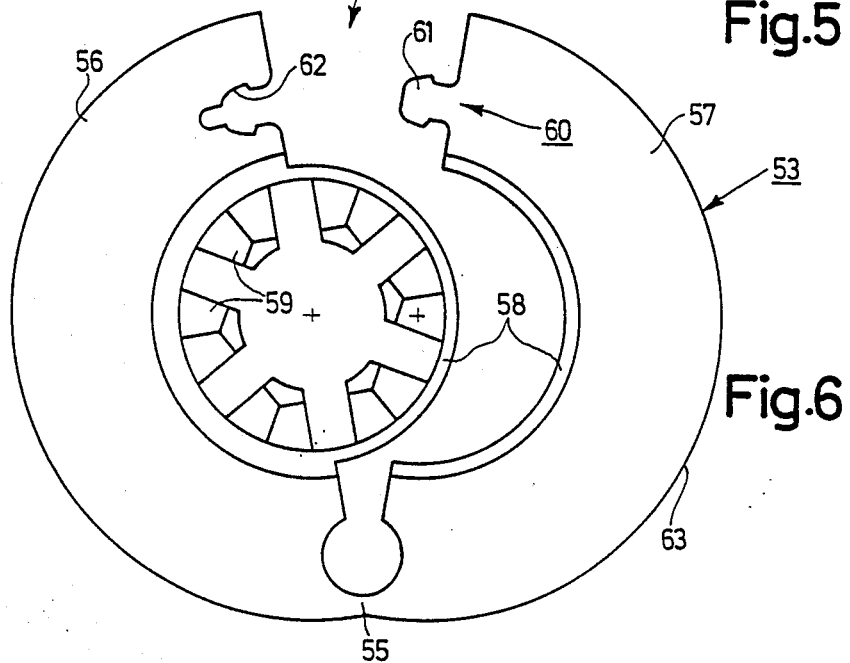
Fig.6

REEL-HUB FOR A TAPE

BACKGROUND OF THE INVENTION

The invention relates to a reel-hub for a tape, in particular a magnetic-tape or ink ribbon, which hub has cylindrical circumferential surface on which the tape can be wound and is divided into two semicylindrical reel-hub portions along a dividing zone. The reel-hub portions are interconnected integrally by means of an elastically deformable bridge which bound the dividing zone at one end, which bridge constitutes an articulation between the two reel-hub portions and whose circumferential bounding surface forms a part of the circumferential surface of the reel-hub. The reel-hub portions are held together by detachable connecting means arranged at the open other end of the dividing zone and which, to attach an end of the tape introduced into the dividing zone through the open end of said zone to the reel-hub, clamp said tape end between them along at least a part of the dividing zone.

Such a reel-hub, intended for a magnetic-tape, is known from U.S. Pat. No. 4,213,578. In this known reel-hub the two reel-hub portions are constituted by a main portion forming the major part of the reel-hub and a clamping portion which is integrally connected to the main portion by the limb and which forms only a small portion of the reel-hub. The clamping portion is separated from the main portion along a substantially tangential dividing zone and which is pivotable relative to the main portion substantially in the radial direction of the reel-hub between a position in which it is disengaged from the main portion and a clamping position in which it engages in the main portion.

As a result of the small size and the resulting short lever arm of the clamping portion this portion, when in its position in which it is disengaged from the main portion, must be pivoted through a comparatively large angle relative to its clamping position in order to ensure that the end of the magnetic-tape to be attached can be introduced into the dividing zone without being obstructed by the clamping portion. For clamping the magnetic-tape end to be attached the clamping portion must be moved through this comparatively large angle from its position in which it is disengaged from the main portion to its clamping position, which produces relatively large deformations of the elastically deformable bridge, which may give rise to a irregulatities in the circumferential surface of the reel-hub. Such irregularities are very undesirable, because, if the reel-hub is not used for a long time, they manifest themselves as permanent deformations in the superimposed turns of magnetic-tape wound on the circumferential surface of the reel-hub. As the magnetic-tape is unwound from the reel-hub in an appropriate apparatus these deformations impair the uniform contact between the magnetic-tape and the magnetic head of the apparatus which cooperates with said tape for the purpose of recording and reproducing information signals on/from the magnetic-tape, resulting in the recording and reproduction quality of the information signals being degraded. Moreover, when the magnetic-tape is clamped on the know reel-hub the end of the magnetic-tape is clamped on the known reel-hub the end of the magnetic-tape to be attached can be introduced into the dividing zone between the reel-hub portions in a predetermined direction in only one position of the reel-hub but not in the inverted position of the reel-hub, because the open end of the dividing zone is oriented correctly relative to the end of the magnetic-tape to be attached only in said one position. When in the case of automated clamping the reel-hubs are fed in automatically, this is a disadvantage, because reel-hubs fed in the inverted position then have to be rejected. Moreover, since such a small clamping portion is less robust, the risk of damaging or breaking while handling said portion to clamp the magnetic-tape onto the reel-hub is comparatively high.

SUMMARY OF THE INVENTION

It is the object of the invention to mitigate the aforementioned problems and to provide a reel-hub whose tow reel-hub portions have to be pivoted apart through a comparatively small angle only to introduce the tape end to be attached into the dividing zone between said portions, introduction of the tape end to be attached into said dividing zone being possible in both mutually inverted positions of the reel-hub, and both reel-hub portions being of robust construction. To this end the invention is characterized in that the two ends of the dividing zone of the reel-hub are disposed substantially diametrically opposite one another and in that at least at its open end the dividing zone extends substantially in the radial direction of the reel-hub. This provides an optimum mechanical advantage for the pivotal movement of the two reel-hub portions relative to one another, so that only a comparatively small angular spacing is required between the two reel-hub portions to introduce the tape end to be attached into the dividing zone between the two reel-hub portions. This means that for clamping the tape between the two reel-hub portions these portions have to be pivoted towards one another through a small angle only and consequently there is substantially no deformation of the elastically deformable bridge, which precludes the occurrence of flaws in the circumferential surface of the reel-hub, in the case of a magnetic-tape, and consequent degradations in recording and reproduction quality when the magnetic-tape is unwound from the reel-hub. Moreover, the tape end to be attached can be introduced into the dividing zone between the two reel-hub portions in both mutually inverted positions of the reel-hub, because at least at the location of its open end the dividing zone, via which the tape end to be attached can be inserted between the reel-hub portions, can be aligned in the same direction, namely in the radial direction of the reel-hub, in both positions of the reel-hub. Further, this results in a robust construction which substantially excludes the risk of damaging or breakage of the reel-hub portions while they are manipulated to clamp the tape in position.

It is to be noted that U.S. Pat. No. 4,213,578 describes a divided reel-hub in which the two partly cylindrical reel-hub portions have a dividing zone with diametrically opposite ends. However, in this case the two reel-hub portions can be separated completely from one another and are not interconnected integrally by an elastically deformable bridge, so that it does not teach how to minimize the deformation of such a bridge when the tape is clamped between two reel-hub portions which are integrally interconnected by said bridge, as in the case of the reel-hub in accordance with the invention. Since the two reel-hub portions can be separated completely from each other, this also means their position during storage and their manipulation while attaching of the tape require more attention than in the case of the reel-hub in accordance with the invention, which comprises two reel-hub portions which are integrally interconnected.

In a reel-hub in accordance with the invention, the two reel-hub portions may be constructed in such a way that one portion is shaped substantially as a hollow semicylinder. However, it is found to be advantageous if the reel-hub is divided into two substantially mirrosymmetrical real-hub portions along a dividing zone which extends diametrically across the reel-hub. This simplifies the mould construction when a reel-hub is to be injection-moulded from a plastics. Further, the two reel-hub portions now have the same optimum robustness.

In order to preclude axial misalignment of the two interengaging reel-hub portions, which are held together by connecting means constructed, for example, as interlocking means or snap-lock means, the reel-hub portions can be positioned relative to one another on both axial directions of the reel-hub by means of a separate positioning tool while the tape is attached. However, it is found to be advantageous if for axially positioning the two reel-hub portions relative to one another the reel-hub comprises at least one pair of corresponding positioning stops, one on each of the two reel-hub portions, at the location of the dividing zone between the reel-hub portions, of which one stop engages over the corresponding other stop in at least one of the two axial directions. The ensures in a simple manner that a reliable and accurate axial positioning of the two reel-hub portions relative to one another is obtained, also after the tape has been attached.

Such a pair of positioning stops can be constructed to position one reel-hub portion relative to the other reel-hub portion in only one of the two axial directions or in both axial directions, the latter being achieved, for example, by means of a pin-hole connection, but this construction cannot readily be injection-moulded. It is easier to manufacture positioning stops which comprise one stop engaging over the corresponding other stop in only one axial direction and which consequently position one reel-hub portion relative to the other reel-hub portion in only one axial direction. Therefore, it is found to be advantageous if two pairs of corresponding positioning stops are provided, one stop of each pair engaging over the corresponding other stop in only one axial direction, and the two positioning stops on each of the reel-hub portions are offset relative to one another perpendicularly to the two axial directions. This provides a construction allowing easy removal from the mould in the case of injection-moulding.

BRIEF DESCRIPTION OF THE DRAWINGS

Three embodiments of the invention will now be described in ore detail, by way of example, with reference to the accompanying drawings.

FIG. 1 shows diagrammatically, to substantially twice full scale, a magnetic-tape cassette in which two reel-hubs in accordance with a first embodiment of the invention are juxtaposed for taking up the magnetic-tape;

FIG. 2 shows diagrammatically, to an enlarged scale in comparison with FIG. 1, a reel-hub in accordance with the invention used in the cassette shown in FIG. 1 and comprising two reel-hub portions which are integrally interconnected by a bridge, the two reel-hub portions being in a position in which they are disengaged from each other and an end of a magnetic-tape being introduced in the dividing zone between the two reel-hub portions to clamp said magnetic-tape end between said portions;

FIG. 3 shows the reel-hub of FIG. 2, the two reel-hub portions being in an interengaged position in which a magnetic-tape end is clamped between said portions;

FIG. 4, in the same way as FIG. 2 but to an enlarged scale, shows a second embodiment of a reel-hub in accordance with the invention;

FIG. 5 shows a part of the reel-hub in a sectional view taken on the line V—V in FIG. 4;

FIG. 6, in the same way as FIG. 4, shows a third embodiment of a reel-hub in accordance with the invention.

DESCRIPTION OF THE PREFERRED EMBODIMENT

FIG. 1 shows a substantially rectangular cassette 1 in which two cylindrical reel-hubs 3 and 4 are a magnetic-tape 2 are arranged. In a manner not shown, the reel-hubs 3 and 4 are rotatably supported in the bottom wall, which is not visible, and the upper wall 7 of the cassette 1 by means of annular flanges 5 and 6 which project from their flat radial walls in the two opposite axial directions of the reel-hubs. The bottom wall and the upper wall 7 are formed with circular openings 8 and 9 which are coaxial with the annular flanges 5 and 6 and the reel-hubs 3 and 4 respectively, through which openings winding spindles of a magnetic-tape apparatus intended for use in conjunction with the cassette 1 can be introduced to rotate the reel hubs 3 and 4, radially projecting portions on the spindles engaging the driving elements 10 and 11 of the reel-hubs 3 and 4.

In the cassette 1 shown in FIG. 1 the magnetic-tape 2 is wound completely on the cylindrical circumferential surface 12 of the reel-hub 3. The magnetic-tape 2 extends from the reel-hub 3 over a first tape guide 13, along the narrow side wall 14 of the cassette and over a second tape guide 15 to the second reel-hub 4. The side wall 14 has two openings 16 and 17 through which a magnetic erase head and a magnetic recording/-playback head of the magnetic-tape apparatus intended for use in conjunction with the cassette 1 can cooperate with the magnetic-tape 2 to scan this tape. The magnetic-tape 2 is pressed against the two magnetic heads by means of two pressure pads 18 and 19 which, in a manner not shown, are arranged in the cassette 1 on supports 20 which are arranged to be movable transversely of the side wall 14.

FIGS. 2 and 3 show a reel-hub in accordance with the invention, as used in the cassette 1 and on whose cylindrical circumferential surface 12 the magnetic-tape 2 can be wound after it has been attached to this reel-hub. The reel-hub 3, which is made of a plastics, is divided in two substantially mirror-symmetrical reel-hub portions 22 and 23 along a dividing zone 21 which extends diametrically across the reel-hub 3, so that the two ends of the dividing zone 21 adjoining the circumferential surface 12 of the reel-hub 3 are situated diametrically opposite one another and the dividing zone 21 extends from its open end in the radial direction of the reel-hub 3. The two reel-hub portions 22 and 23 are integrally interconnected by an elastically deformable bridge 24, which forms a kind of integral hinge between the two reel-hub portions 22 and 23. The bridge bounds the dividing zone 21 at one end, and the circumferential bounding surface of the bridge forms part of the circumferential surface of the reel-hub 3. Moreover, at the location of the open end of the dividing zone 21 the two reel-hub portions 22 and 23 are held together by means of a two-part detachable connecting means 25, which in the present case is constructed as a snap-lick means. The snap-lock means 25 comprises a hook 26 which projects from the reel-hub portions 22 and a nose-like projection 27 which projects from the other reel-hub portion 23 and in the snapped-in condition of these snap-lock means 25 engages behind the hook 26.

In their interengaged position shown in FIG. 3 the two reel-hub portions 22 and 23 clamp magnetic-tape end 2 between them, which tape has been introduced through the open end of the dividing zone 21 to attach said tape end to the reel-hub 3 along a part of the dividing zone 21. For this purpose the reel-hub 3 comprises a two-part clamping means 28 comprising a substantially cylindrical clamping projection 29 which projects from the reel-hub portion 23 into the dividing zone 21 and a substantially hollow cylindrical clamping recess 30 which is formed in the reel-hub portion 22 and can be engaged by the clamping projection. When the magnetic-tape 2 is attached by pivoting the two reel-hub portions 22 and 23 towards one another, the clamping projection 29 presses the magnetic-tape 2 into the clamping recess 30 and, once the clamping projection 29 has fully engaged the clamping recess 30, it clamps the magnetic-tape 2 firmly in position, the magnetic-tape 2 being secured in a reliable manner because it cooperates with the clamping projection 20 over a substantial length.

The diametrical division of the reel-hub into the two reel-hub portions which are integrally interconnected by the bridge provides an optimum mechanical advantage for the pivotal movement of the two reel-hub portions relative to one another, so that for clamping the magnetic-tape between the two reel-hub portions these portions have to be pivoted towards one another through a comparatively small angle only, which has the advantage of a minimal deformation of the bridge. As a result of the diametrical dividing zone this zone extends in a radial direction at the location of its open end, regardless of whether the reel-hub is in the position shown in FIGS. 2 and 3 are in a position which is inverted relative thereto. Therefore, the end of the magnetic-tape to be attached can be introduced into the dividing zone between the two reel-hub portions in the same predetermined direction, i.e. in the radial direction of the reel-hub, in both directions of the reel-hub. This is an advantage when in the case of automated clamping the reel-hubs are fed in automatically, because the magnetic-tape can then be attached in both mutually inverted positions of the reel-hubs. Further, the diametrical division of the reel-hub results in an optimum robustness for both reel-hub portions, which precludes problems in manipulating the two reel-hub portions while attaching the magnetic-tape. The provision of the snap-lock means ensures that the two reel-hub portions are secured very reliably to one another after the magnetic-tape has been attached which guarantees a reliable connection of the magnetic-tape to the reel-hub.

FIG. 4 shows a second embodiment of the reel-hub 31 in accordance with the invention, comprising a cylindrical circumferential surface 32 for taking up a magnetic-tape, not shown. Along a dividing zone 33 the reel-hub 31 is divided into two semicylindrical reel-hub portions 35 and 36 which are integrally interconnected by an elastically deformable bridge 34 of the integral-hinge type. The dividing zone 33 is formed in such a way that its two ends are situated diametrically opposite one another and that the dividing zone extends from its open end in the radial direction of the reel-hub 31. At the end of the dividing zone 33 which is bounded by the bridge 34 this zone extends in a direction which deviates from the radial or diametrical direction, which is in order to ensure that in the present case the dividing zone 33 does extend through but past the driving element 37 of the reel-hub 31. As a result of the diametrical position of the two ends of the dividing zone relative to each other and the radial orientation of the dividing zone at its open end this reel-hub also provides an optimum mechanical advantage and very robust construction for both reel-hub portions and the magnetic-tape end can be introduced into the dividing zone between the two reel-hub portions in both mutually inverted positions of the reel-hub, so that this reel-hub has the same advantages as the reel-hub in accordance with the invention as shown in FIGS. 2 and 3.

For axially positioning the two reel-hub portions 35 and 36 relative to one another the reel-hub 31 comprises two pairs of corresponding positioning stops, one on each of the two reel-hub portions 35 and 36, at the location of the dividing zone 33 between the two reel-hub portions, of which one stop engages over the corresponding other stop in one of the two axial directions of the reel-hub 31, one direction being indicated by the arrow 38 and the other direction by the arrow 39 in FIG. 5. The positioning stops of one pair comprise a projection 40 on one reel-hub portion 35 and a portion 41 of the other reel-hub portion 36. In the engaged position, not shown, of the two reel-hub portions 35 and 36 the projection 40 engages over the portion 41 in the axial direction 39 and, conversely, the portion 41 engages over the projection 40 in the axial direction 38, the projection 40 and the portion 41 abutting against one another with their facing bounding surfaces 42 and 43. The positioning stops of the second pair comprise a portion 44 of a driving element 46 on a reel-hub portion 35 which element is situated nearest the open end of the dividing zone 33 and is formed with a recess 45, and a projection 47 on the other reel-hub portion 30. I the engaged position, not shown, of the two reel-hub portions 35 and 36 the projection 47 engages the recess 45 in the driving element 46 and the portion 44 engages over the projection 47 in the axial direction 38 and, conversely, the projection 47 engages over the portion 44 of the coupling element 46 in the axial direction 39, the portion 44 of the coupling element 46 and the projection 47 abutting against one another with their facing bounding surfaces 48 and 49. By means of the pairs of positioning stops 40, 41 and 44, 47, which act in opposite directions, the two reel-hub portions 35 and 36 are axially positioned relative to one another in their interengaged position, thus ensuring that an axial displacement of the two reel-hub portions is excluded. Such an axial displacement would have an adverse effect on a uniform rotation of the reel-hub during winding and unwinding of a magnetic-tape. As can be seen in FIG. 4, the positioning stops are so arranged on the reel-hub 31 that the two positioning stops 40, 44 and 41, 47 on each of the reel-hub portions 35 and 36 respectively are offset from one another perpendicularly to the two axial directions 38 and 39. This construction facilitates removal of the mould in the case of injection moulding, because the mould portions necessary for the formation of the positioning stops can be removed from the positioning stops in opposite axial directions.

The reel-hub 31 show in FIG. 4 does not comprise a separate connecting means for holding the two reel-hub portions 35 and 36 together, the two reel-hub portions being held together by a clamping means 50 which, in principle, is of the same construction as that of the reel-hub 3 shown in FIGS. 2 and 3, but which in the present case is dimensioned in such a way that the clamping projection 51 engages the clamping recess 52 with a press-fit in the interengaged condition of the two reel-hub portions. Thus, the clamping device 50 performs a double function because it serves both for attaching a magnetic-tape to the reel-hub 33 and for securing the two reel-hub portions 35 and 36 to one another.

FIG. 6 shows a third embodiment of the reel-hub 53 in accordance with the invention, in which the two ends of a dividing zone 54 between two reel-hub portions 56 and 57, which are integrally interconnected by an elastically deformable bridge 55 of the integral-hinge type, are also situated diametrically opposite one another, so that in this case it is also possible to benefit from an optimum mechanical advantage. Moreover, the dividing zone 54 extends in the radial direction of the reel-hub 53 at the location of its open end, so that the magnetic-tape end to be attached can be introduced into the open end of the dividing zone 54 in the same direction, i.e. the radial direction, in both mutually inverted positions of the reel-hub 53. The dividing zone 54 of the reel-hub 53 does not extend diametrically across this hub, but its radial part at the location of the open end is adjoined by a part having such a shape that it divides one half of an annular flange 58 of the reel-hub 53, so that portion 57 of the two reel-hub portions 56 and 57 has a hollow substantially semicylindrical shape which is completed by the reel-hub portion 56 to form the complete reel-hub 53. Such a dividing zone 54 ensures that all the driving elements or sprockets 59 of the reel-hub 53 are situated on the reel-hub portion 56, which is favourable to obtain equidistantly spaced driving elements or sprockets 59.

For securing the two reel-hub portions 56 and 57 to one another and for attaching a magnetic-tape the reel-hub 53, in the same way as the reel-hub 31 shown in FIG. 4, comprises a connecting means which is constructed as a clamping means 60 and which comprises a clamping projection 61 on the reel-hub portion 57 and a clamping recess 62 in the other reel-hub portion 56 to be engaged by the clamping projection 61. In the interengaged condition of the reel-hub portions 56 and 57 these portions are held together by the clamping means 60 and a magnetic-tape is clamped in position by the clamping means 60, enabling the tape to be wound on the cylindrical circumferential surfaces 63 of the reel-hub 53.

Obviously, further embodiments of the reel-hubs are possible within the scope of the invention. For example, instead of the clamping means provided on each of the three reel-hubs described in the foregoing, the radial bounding walls of the two reel-hub portions at the location of the open end of the dividing zone may be provided with serration-like teeth which extend in the axial direction of the reel-hub and which mesh with one another in the engaged condition of the reel-hub portions, the magnetic-tape being pressed into the corresponding tooth gaps by the tooth crests and being firmly clamped in position due to the resulting meandering pattern. In each of the three reel-hubs described in the foregoing the closed end and the open end of the dividing zone are situated exactly diametrically opposite one another. However, one of the two ends may be in position which deviates slightly from the exact diametrical position, opposite deviations of maximum 5° to each side being found to be permissible. The reel hubs in accordance with the invention cannot only be used in conjunction with magnetic-tapes, as in the three embodiments described in the foregoing, but they can also be employed in conjunction with other tape-like materials, for example textile- and plastics-ink ribbons for printers, such as impact printers and thermotransfer printers using ink ribbons accommodated in ribbon cartridges.

What is claimed is

1. In a reel hub for a tape having an annular hub with an outer circumferential surface for winding a tape thereon and an inner portion defining an opening and having an arrangement of driving elements, said annular hub defining a hub axis transverse to the plane of the hub and having two hub portions separated along a substantially radial direction at a first circumferential hub location and, at a second circumferential hub location substantially diametrically opposite said first circumferential location, said hub being partially separated in a direction extending from said inner portion towards said outer circumferential surface forming an elastically deformable bridge connecting said two hub portions, at said first circumferential location said hub portions having opposing faces comprising tape clamping means for clamping an end portion of a tape therebetween and locking means for locking said two hub portions together in a direction transverse to said hub axis, wherein the improvement comprises:

said hub at the area of said first circumferential location comprising axial aligning means for axially aligning said two hub portions.

2. A reel hub as claimed in claim 1, wherein said axial aligning means comprises said hub portions having axially offset positioning stops with opposing faces, said stops being arranged such that said faces butt against each other when said hub portions are locked together to prevent movement of one hub portion with respect to the other hub portion in a first axial direction.

3. A reel hub as claimed in claim 2, wherein said hub portions comprise a second pair of said positioning stops at said first circumferential location having opposing faces which butt against each other when said hub portions are interlocked for preventing movement of said hub portions in the axial direction opposite said first axial direction.

4. A reel hub as claimed in claim 3, wherein said second pair of positioning stops are offset from said first pair of positioning stops in a radial direction from said hub axis.

5. A reel hub as claimed in claim 1, wherein said arrangement of driving elements comprises spaced sprockets, and said partial separation of said hub at said second circumferential separation extends from said inner portion between a pair of said sprockets at an angle from the radial direction such that said resilient bridge is diametrically opposite said first circumferential location.

6. A reel hub as claimed in claim 1, wherein said hub in the area of said first circumferential location comprises axial locking means for axially locking said two hub portion.

7. A reel hub as claimed in claim 6, wherein said axial locking means comprises said hub portions having two pair of positioning stops, the stops of each pair being disposed on a respective hub and having opposing faces which butt against each other for preventing axial displacement of said hub portions in an axial direction, said pairs of stops being arranged for locking said hub portions against any axial movement, and said pairs being displaced on said hub portions in a direction transverse to said hub axis.

8. A reel hub as claimed in claim 7, wherein said inner portion comprises a flange on one of said hub portions extending between said first and second circumferential locations on which a portion of said driving elements are disposed such that said arrangement of driving elements is disposed on said one hub portion, the other said hub portion between said first and second circumferential locations having a shape complementing said flange.

9. A reel hub as claimed in claim 1, wherein said inner portion comprises a flange on one of said hub portions extending between said first and second circumferential locations on which a portion of said driving elements are disposed such that said arrangement of driving elements is disposed on said one hub portion, the other said hub portion between said first and second circumferential locations having a shape complementing said flange.

10. In a tape cassette having a housing and two annular reel hubs disposed therein, each hub defining a hub axis transverse to the plane of the hub and having an outer circumferential surface for winding a tape thereon and an inner portion defining an opening with an arrangement of driving elements, and said housing having a pair opposing major walls and narrow side walls extending between said major walls, said major walls having inner annular flanges for rotatably supporting said reel hubs and openings coaxial with said annular flanges for allowing insertion of winding spindles for engaging with said driving elements of said reel hubs, wherein the improvement comprises:

a said hub having two hub portions separated along a substantially radial direction at a first circumferential hub location and, at a second circumferential hub location substantially diametrically opposite said first circumferential location, said hub being partially separated in a direction extending from said inner portion towards said outer circumferential surface forming an elastically deformable bridge connecting said two hub portions, at said first circumferential locatin said hub portions having opposing faces comprising tape clamping means for clamping an end portion of a tape therebetween, and locking means for locking said two hub portions together in a direction transverse to said hub axis, and said hub at the area of said first circumferential location comprising axial aligning means for axially aligning said two hub portions.

11. A tape cassette as claimed in claim 10, wherein said axial aligning means comprises said hub portions having axially offset positioning stops with opposing faces, said stops being arranged such that said faces butt against each other when said hub portions are locked together to prevent movement of one hub portion with respect to the other hub portion in a first axial direction.

12. A tape cassette as claimed in claim 11, wherein said hub portions comprise a second pair of said positioning stops at said first circumferential location having opposing faces which butt against each other when said hub portions are interlocked for preventing movement of said hub portions in the axial direction opposite said first axial direction.

13. A tape cassette as claimed in claim 12, wherein said second pair of positioning stops are offset from said first pair of positioning stops in a radial direction from said hub axis.

14. A tape cassette as claimed in claim 10, wherein said hub in the area of said first circumferential location comprises axial locking means for axially locking said two reel hub portions.

15. A tape cassette as claimed in claim 14, wherein said axial locking means comprises said hub portions having two pair of positioning stops, the stops of each pair being disposed on a respective hub and having opposing faces which butt against each other for preventing axial displacement of said hub portions in an axial direction, said pairs of stops being arranged for locking said hub portions against any axial movement, said pairs being displaced on said hub portions in a direction transverse to said hub axis.

16. A tape cassette as claimed in claim 15, wherein said inner portion comprises a flange on one of said hub portions extending between said first and second circumferential locations on which a portion of said driving elements are disposed such that said arrangement of driving elements is disposed on said one hub portion, the other said hub portion between said first and second circumferential locations having a shape complementing said flange.

17. A tape cassette as claimed in claim 10, wherein said inner portion comprises a flange on one of said hub portions extending between said first and second circumferential locations on which a portion of said driving elements are disposed such that said arrangement of driving elements is disposed on said one hub portion, the other said hub portion between said first and second circumferential locations having a shape complementing said flange.

18. A tape cassette as claimed in claim 10, wherein said driving elements comprise spaced sprockets, and said partial separation of said hub at said second circumferential separation extends from said inner portion between a pair of said sprockets at an angle from the radial direction such that said resilient bridge is diametrically opposite said first circumferential location.

* * * * *